Figure 1:
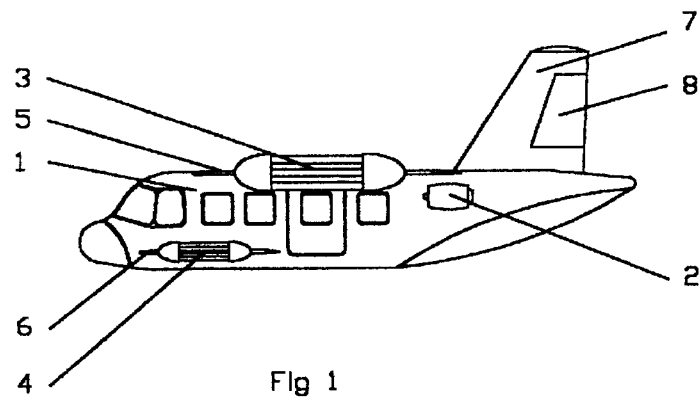

United States Patent [19]
Tsepenyuk

[11] Patent Number: 6,007,021
[45] Date of Patent: Dec. 28, 1999

[54] FLYING APPARATUS FOR A VERTICAL TAKE OFF AND LANDING

[76] Inventor: Mikhail Tsepenyuk, 269 Olean Prwy, H 2F, Brooklyn, N.Y. 11218

[21] Appl. No.: 08/993,306

[22] Filed: Nov. 18, 1997

[51] Int. Cl.$^6$ .................................................. B64C 27/22
[52] U.S. Cl. .................................. 244/9; 244/19; 244/70; 416/111; 416/126
[58] Field of Search .................................. 244/9, 10, 19, 244/20, 70, 6, 7 R; 416/126, 178, 111; 440/93

[56] References Cited

U.S. PATENT DOCUMENTS

| | | | |
|---|---|---|---|
| 1,761,053 | 6/1930 | Rystedt | 244/9 |
| 3,801,047 | 4/1974 | Dell'aquila | 244/19 |
| 4,166,595 | 9/1979 | Ango | 244/9 |
| 4,194,707 | 3/1980 | Sharpe | 244/9 |
| 5,265,827 | 11/1993 | Gerhardt | 244/9 |

FOREIGN PATENT DOCUMENTS

| | | | |
|---|---|---|---|
| 522502 | 8/1921 | France | 244/70 |
| 636843 | 4/1928 | France | 244/9 |
| 1349504 | 12/1963 | France | 244/9 |

*Primary Examiner*—Galen L. Barefoot
*Attorney, Agent, or Firm*—Ilya Zborovsky

[57] ABSTRACT

A flying apparatus has a body; power means; and lifting force generating units, the lifting force generating units being arranged parallel to a plane of symmetry of the body and turnable in a vertical plane, each of the lifting force generating units is formed as a rotor including a plurality of aerodynamic blades arranged uniformly on a disk and at equal distances from an axis of rotation so as to be turnable.

9 Claims, 6 Drawing Sheets

FLYING APPARATUS FOR A VERTICAL TAKE OFF AND LANDING

BACKGROUND OF THE INVENTION

The present invention relates to a flying apparatus for vertical take-off and landing.

The existing flying apparatus of the above mentioned type use the principle of throwing away air and therefore generating a reactive lifting force. Helicopters are built on this principle, and they are the closest as to the construction to the apparatus of the present invention. A known helicopter includes a body, lifting force generating units formed as a aerodynamic blades which are rotatable in a plane parallel to the ground surface, or in other words in a plane which is perpendicular to the symmetry plane of the body. The aerodynamic blades form a so-called carrying screw which, when rotating, throws the air stream downwardly to create a reactive lifting force. Helicopters are widely used because of their highly efficient performance, simple construction and convenience to use. However, the helicopters have the following disadvantages. The principle of generating a lifting force by throwing down the airstream with a carrying screw makes difficult performing operations on low altitudes, in a mode of suspension, and on the ground. Also, they are characterized by an aerodynamic crisis of the carrying screw which occurs at the speed of horizontal flight 80–100 m/sek. With this relatively low speed, the lifting force of the carrying screw lowers. Therefore, all existing helicopters have a limited speed of horizontal flight.

SUMMARY OF THE INVENTION

Accordingly, it is an object of present invention to provide a flying apparatus of the above mentioned general type, which avoids the disadvantages of the prior art.

In keeping with these objects and with others which will become apparent hereinafter, one feature of present invention resides, briefly stated, in a flying apparatus in which the lifting force generating units are arranged parallel to a plane of symmetry of the body and are turnable in a vertical plane, and they are formed as rotors including aerodynamic blades having a symmetrical profile and arranged on a disk at equal distances from a rotary axis and capable of turning.

When the flying apparatus is designed in accordance with the present invention, it eliminates the disadvantages of the prior art and provides for highly advantageous results.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1*a*–1*c* and 2 are side views and a plan view of a flying apparatus in accordance with the present invention;

FIGS. 3, 4 and 5 are views showing sections of a lifting force generating unit of the inventive flying apparatus;

FIG. 6 is a view showing a section a lifting force generating unit with three aerodynamic blades;

FIGS. 7, 8, 9, and 10 are views showing a double-rotor lifting force generating unit in a longitudinal and transverse cross-section; and FIGS. 11, 12 and 13 are views showing three positions for changing the aero shape of the aerodynamic blades of the lifting force generating unit.

DESCRIPTION OF PREFERRED EMBODIMENTS

A flying apparatus for a vertical take-off and landing shown in FIGS. 1 and 2 has a body 1, a power unit 2, lifting force generating units of a rotor type 3 and 4 arranged on FIGS. 5 and 6 and having an aerodynamic profile in a cross-section, a keel 7 with a turning rudder 8. The lifting force generating unit with one rotor is shown in FIGS. 3, 4 and 5 and has aerodynamic blades 10 which have a symmetrical aerodynamic profile and are arranged on disks 11 through axles 12. The axles 12 pass through centers of gravity of the aerodynamic blades 10. The axles 12 are mounted on disks so as to be able to rotate, through corresponding bearings 13. The aerodynamic blades 10 are arranged uniformly on the circumference B as shown in FIG. 5. The disks 11 are mounted on a mounting unit 9 so that they can turn in bearings 21. The mounting unit 9 is mounted in the body 1, not shown in the drawings, so that it can turn relative to an axis A. The lifting force generating unit includes a motor 14 which is arranged on the mounting unit 9 and connected with the disk 11, and through the disk 11 with the rotor. The mater 14 can be of any type, but preferably it is formed as an electric motor.

The aerodynamic blades 10 have a mechanism for setting an attack angle, which includes a cam disk 15, a unit 16 for turning the cam disk, and a rod 17 connected to the blade 10 with a roller 18 which cooperates with a profiled groove 19 of the cam disk 15 so that the aerodynamic blades are set with a positive attack angle in any point of the circumference, with the exception of a zone Y where the rearrangement of the aerodynamic blades 10 takes place. The mechanism for setting an attack angle can have a different design, which can provide a positive attack angle of the aerodynamic blades 10 in any point of the circumference.

The lifting force generating units shown in FIGS. 3, 4 and 5 are provided with aerodynamic streamliners 20 which merge into the fins 5 and 6.

The single rotor lifting force generating unit shown in FIG. 6 has aerodynamic blades 22, 23 and 24 located on different circumferences B1, B2 and B3 of the disks 11. Therefore, the aerodynamic blades 22, 23, 24 are arranged at different distances from the rotary axis.

The areas of the aerodynamic blades 22, 23, 24 and the aerodynamic profile of their cross-sections are not necessarily identical, and their magnitudes are determined from their application.

The lifting force generating unit is also provided with a mechanism for setting the attack angle which is not shown in the drawings and can be the same as described above for the single-rotor lifting force generating unit.

The multi-rotor lifting force generating unit shown in FIGS. 7, 8, 9 includes aerodynamic blades 25 and 27 arranged on the disks 26 and 28 similarly to the single-rotor lifting force generating unit. This unit is illustrated as a double-rotor lifting force generating unit. The disk 26 is arranged on the disk 28 through bearings 28. The disks 26 and 28 are connected with a motor 30 through a reducer 31. The lifting force generating unit is also provided with a mechanism for setting an attack angle similar to the above described. It includes a cam disk 32 which is turnable by a motor 33. Rods 34 and 35 are connected with the aerodynamic blades correspondingly 26 and 28, and through rollers 38 and 39, with profiled grooves 40 and 41. The profiled grooves 40 and 41 have different sizes which correspond to the sizes of the corresponding rotor. The roller 38, 39 are arranged on rods 34 and 35 through axles 36 and 37.

Figure 3:
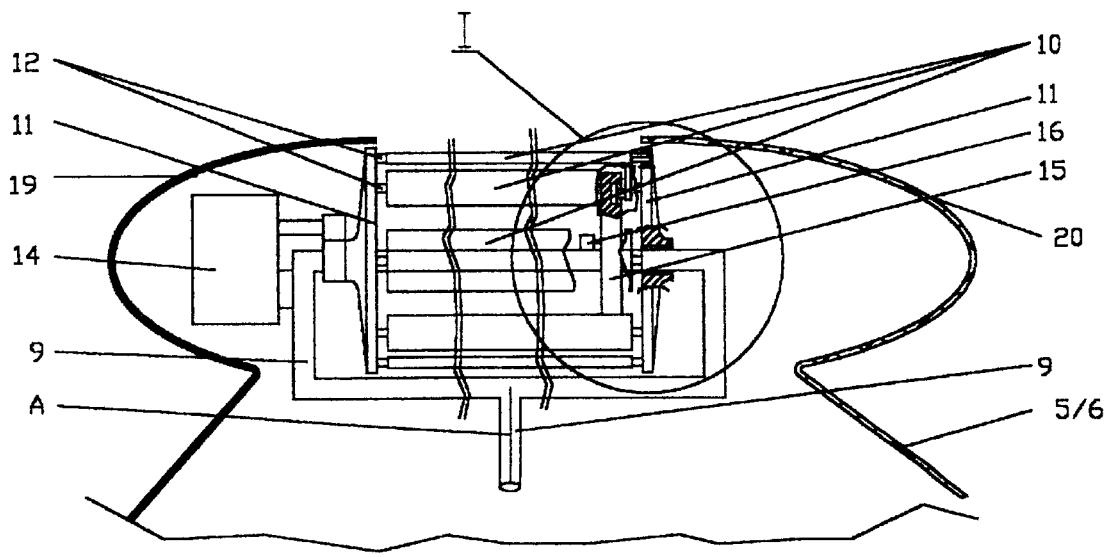
Figure 1A:
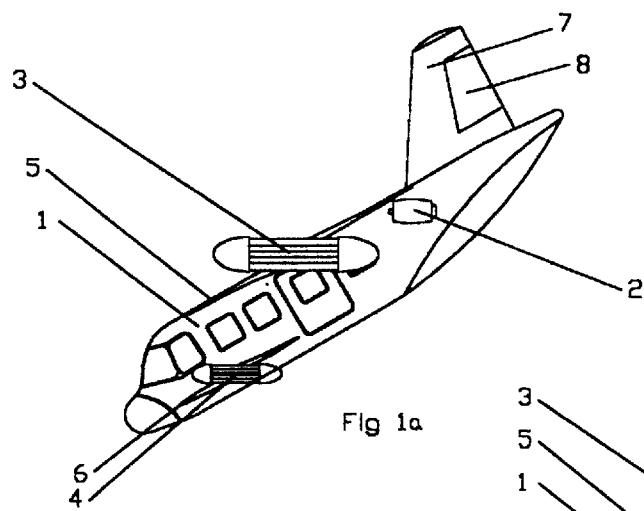
Figure 1B:
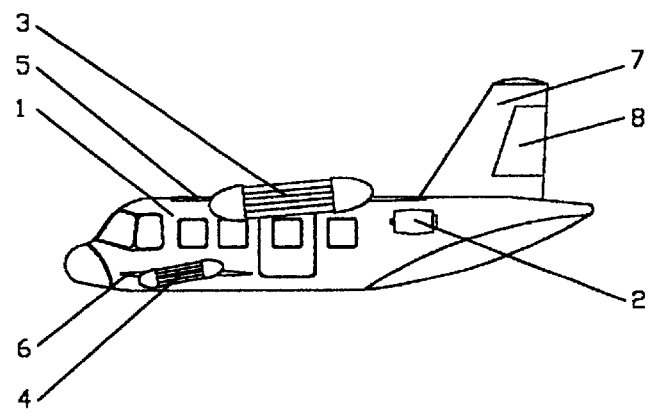
Figure 1C:
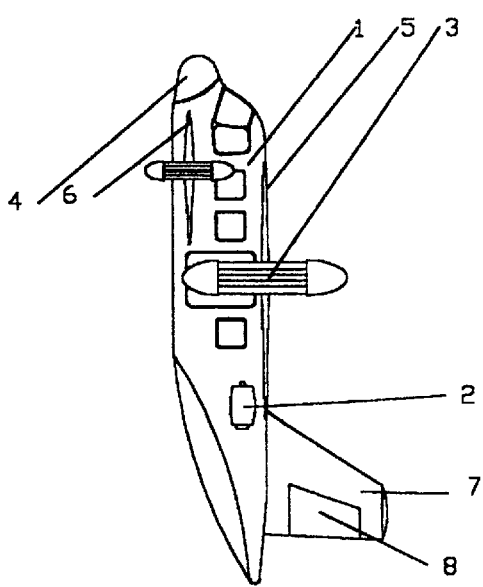
Figure 7:
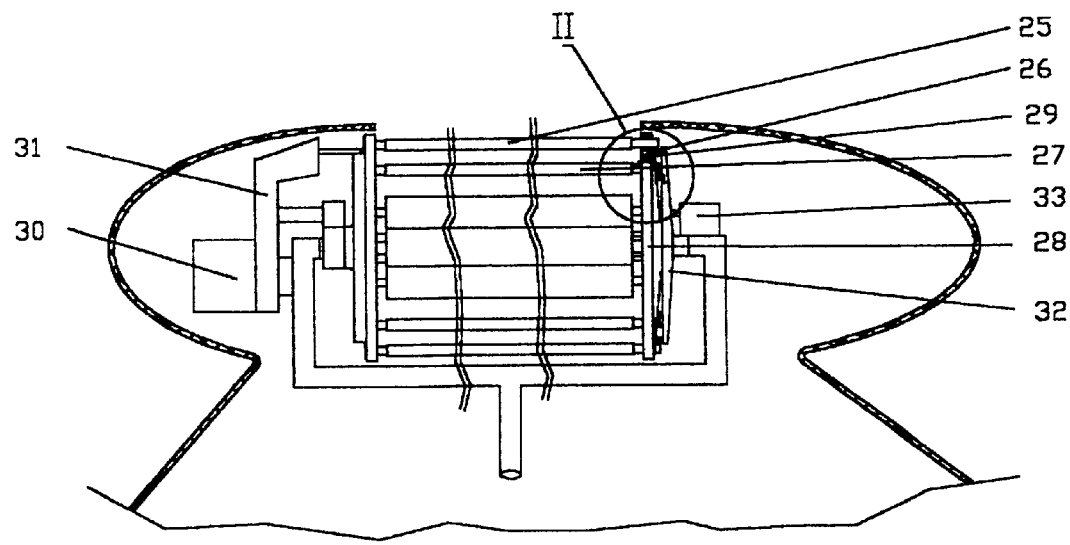
Figure 10:
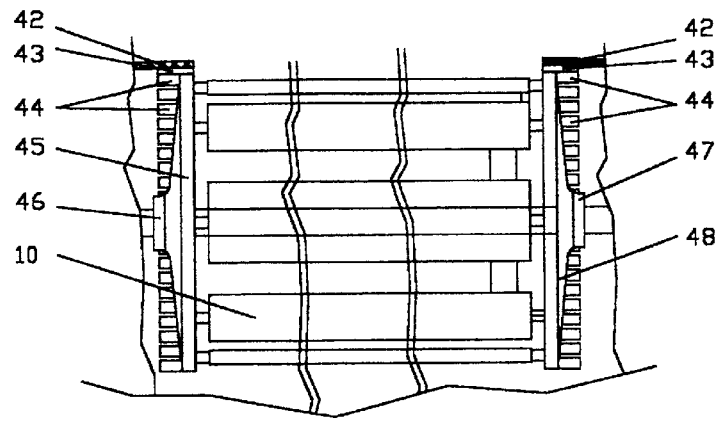

In the single-rotor or multi-rotor lifting force generating unit, instead of the motor 14 of FIG. 3 or motor 30 of FIG. 7, electromagnetic coils are arranged as shown in FIG. 10. The electromagnetic coils 43 are arranged on aerodynamic streamliners 42, while electromagnetic coils 44 are arranged on disks 45. In order to supply electric current to the electromagnetic coils 44, commutators 46 and 47 are provided.

Figure 11:
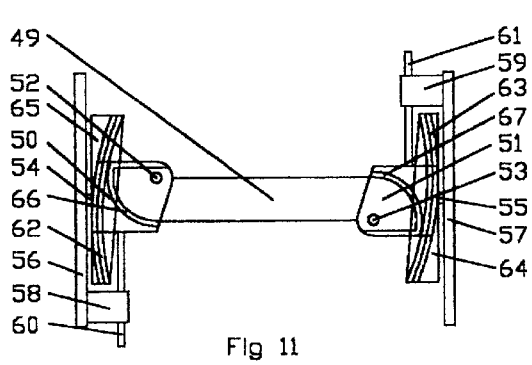
Figure 12:
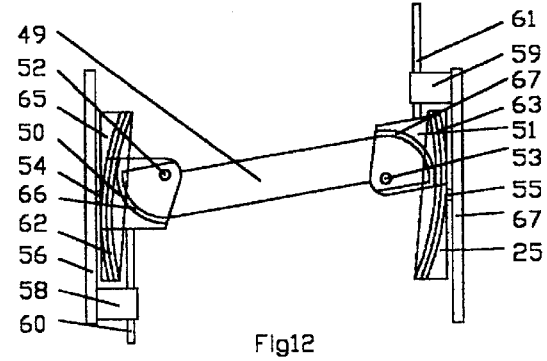
Figure 13:
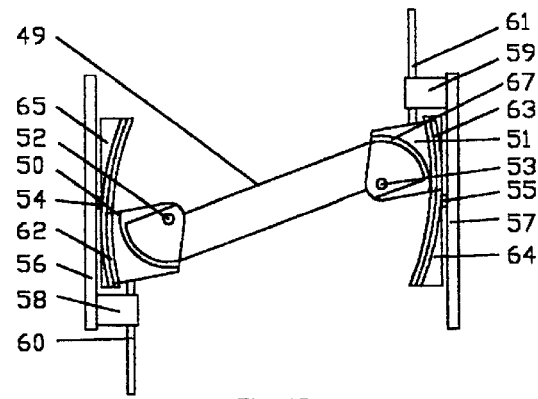

The single-rotor or multi-rotor lifting force generating unit is provided with a mechanism for changing an arrow angle of the aerodynamic blades shown in FIGS. 11, 12 and 13.

For this purpose the aerodynamic blades are composed of three parts including a middle part 49 and two end parts 50 and 51 which are connected with one another by hinges 52 and 53, and radial guides 66 and 67 formed inside the end parts 50 and 51. The end parts 50 and 51 are connected by further radial guides 62 and 63 with carriages 64 and 65, which, through axles 54 and 55, are connected so as to turn with the disks 56 and 57. The carriage 64 and 65 is connected with the mechanism for setting the attack angle, not shown in the drawings. The end parts 50, 51 of the aerodynamic blades are connected through a rod 60 and 61 with a reciprocating mechanism 58 and 59.

The flying apparatus for a vertical take-off and landing with a rotor-type lifting force generating unit shown in FIGS. 1 and 2 flies in the following manner.

After turning on and setting the power unit 2 to a nominal operational mode, the energy generated by the power units 2 is supplied to the motors 14 of FIG. 3 or motors 30 of FIG. 7, or to the electromagnetic coils 43 and 44 of FIG. 10. They start turning the disks 11 with the aerodynamic blade 10 shown in FIGS. 3, 4, 10 or with the aerodynamic blades 22, 23, 24 of FIG. 6, or the disks 26 and 28 with the aerodynamic blades 25 and 27 of FIG. 9. During rotation of the aerodynamic blades 10, or 22, 23, 24, or 25, 27, the attack angle of each aerodynamic blade is positive in any point of their trajectory, with the exception of the zone Y for resetting. The position of the aerodynamic blades is provided by the mechanism for setting the attack angle, since during rotation of the blades, rods 17 with the rollers 18 of FIGS. 3, 4 or rods 34 with the rollers 38 and rods 35 with the rollers 39, the rollers 18 or the rollers 38 move along the profiled grooves 19 of the cam disk 15 of FIG. 3, 4 or along the profiled grooves 40, 41 of the cam disk 32. The profiled grooves 19 and 44, 41 are formed so that they provide the above mentioned value of the attack angle. Thereby the mechanism for setting the attack angle in each of the above described constructions orients the aerodynamic blades in any point of the trajectory to the positive attack angle, so that during rotation of the aerodynamic blades 10 of FIG. 3 or 22, 23, 24 of FIG. 6, or 25, 27 of FIG. 9 a lifting force is generated. A sum of the lifting forces of all aerodynamic blades constitutes the lifting force of the lifting force unit 4, 5 of FIG. 1.

The lifting force is increased with the increase of number of revolutions, and therefore when the rotary speed of the aerodynamic blades is increased to reach a lifting force which exceeds the weight of the flying apparatus, the flying apparatus vertically takes off from the ground and reaches a desired altitude.

The lifting force of the lifting force generating unit can be expressed as follows:

$$Y = \sum Yi = \sum (2\sin\varphi_i + k_i \cos\varphi_i) C_{yi} \rho s_i \frac{\pi^3 D i^2 n^2}{2}$$

wherein $\varphi$ is an angle between centers of gravity of aerodynamic blades with an apex in a rotary point and located on one setting diameter D;

$K_i$ is a coefficient depending on the number of blades;

Cy is a coefficient of a lifting force of a utilized aerodynamic profile at the given deck angle;

$\rho$ is an air density;

$S_i$ is an area of the aerodynamic plane;

$D_i$ is a setting diameter of the aerodynamic blades;

n is a number of revolutions of a rotor.

From the above presented expressions, it can be seen that the greater the number of blades, the lower the amplitude of fluctuation of lifting force. However, if the aerodynamic blades 10 of FIGS. 3, 4, 5 are located on the same setting circumference close to one another, then any of the aerodynamic blades 10 will be in a stream generated by a forward aerodynamic blade.

Figure 4:
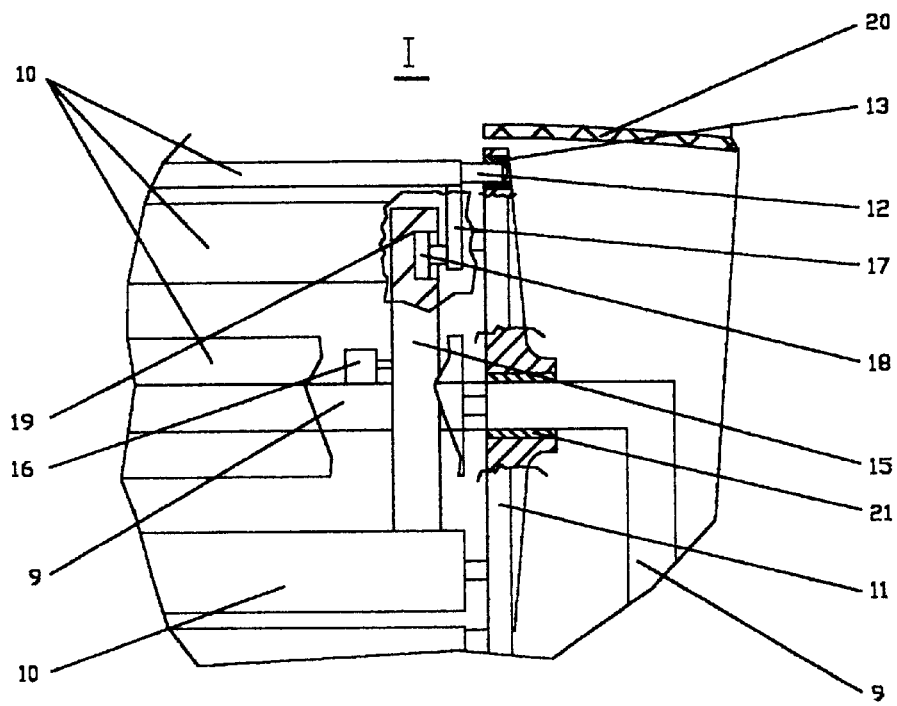
Figure 5:
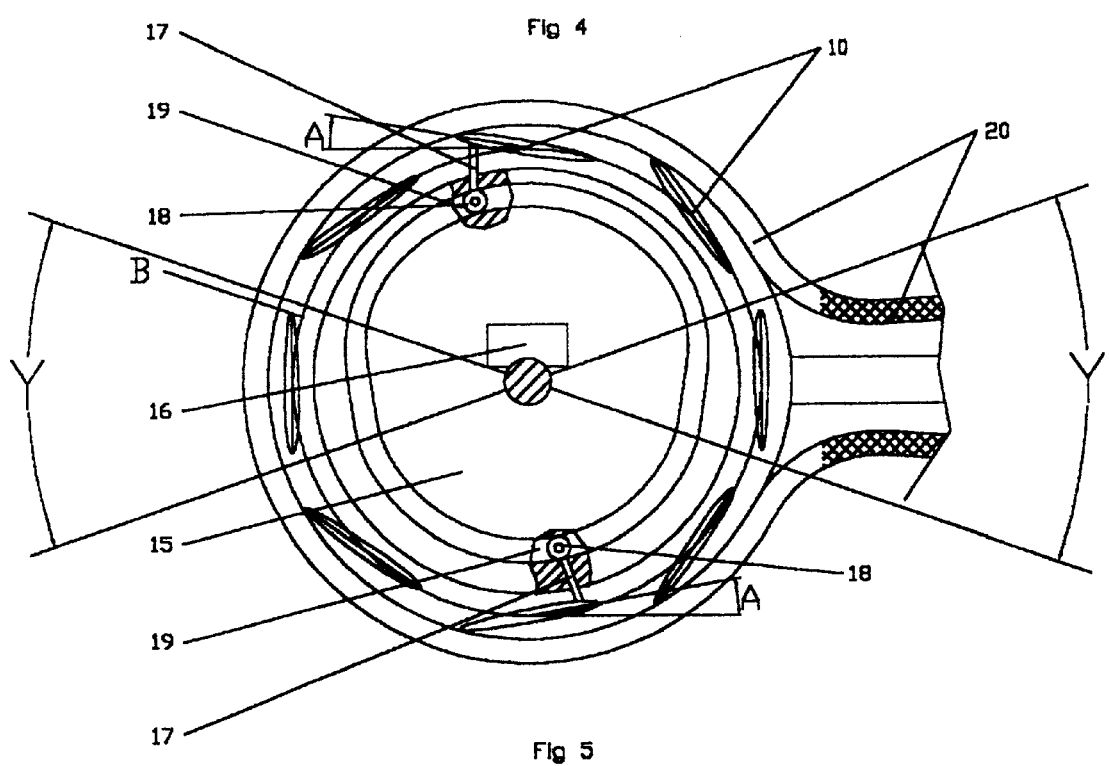

Therefore the single-rotor lifting force generating unit with a single setting circumference of FIGS. 3, 4, 5 has a limited number of aerodynamic blades 10 and has a limited lifting force.

Figure 6:
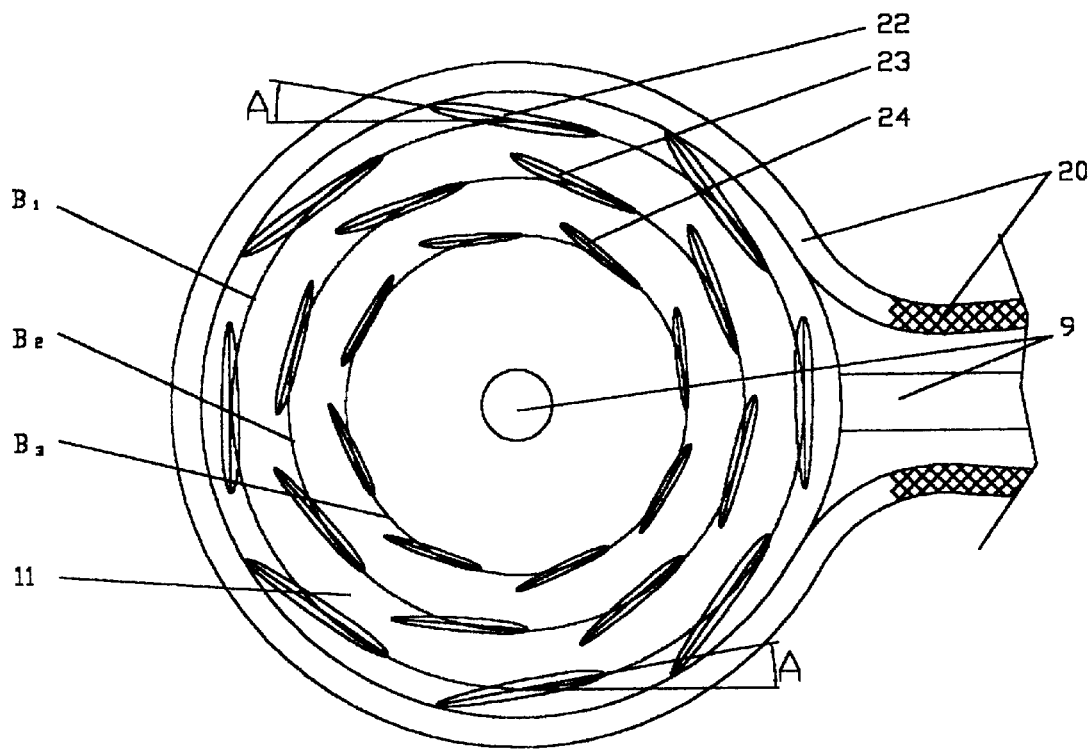

In order to obtain the lifting force generating unit with a greater specific lifting force, the aerodynamic blades 22, 23, 24 can be installed as shown in FIG. 6 on the disks 11 from different setting circumferences B1, B2, B3 . . . Bi. With this construction is possible to have a great number of aerodynamic blades which are sufficiently spaced from one another.

Figure 8:
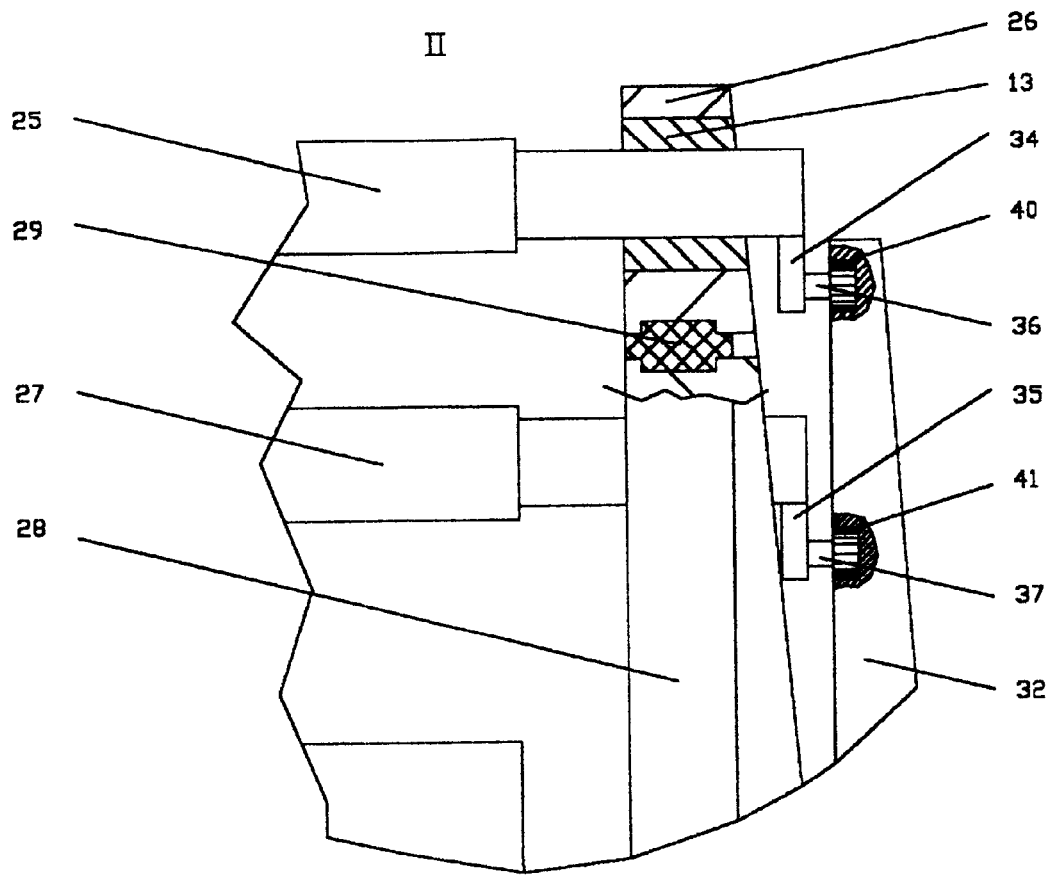
Figure 9:
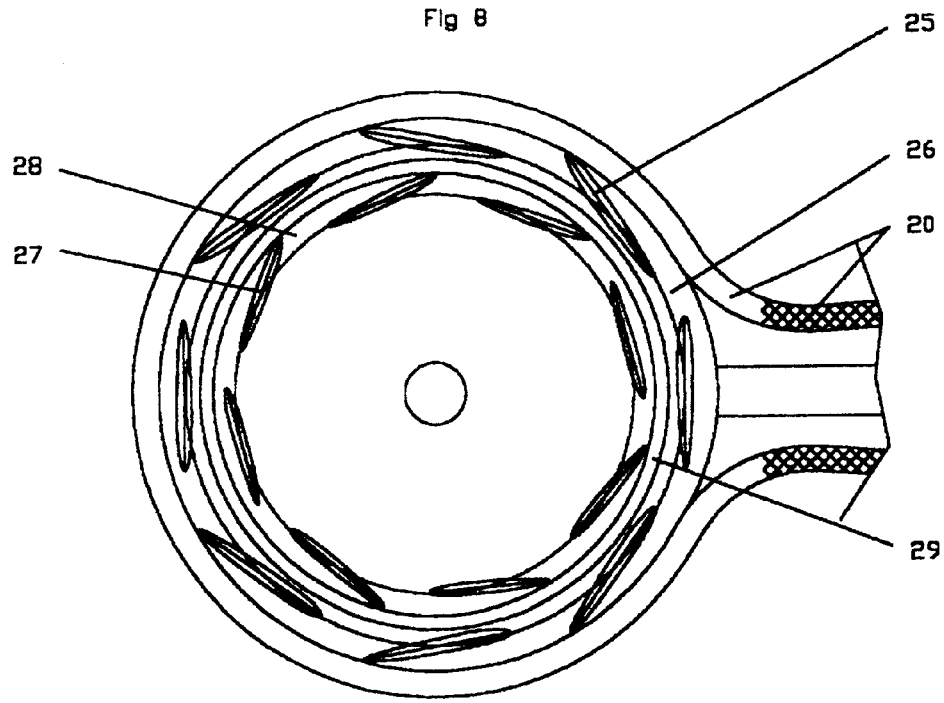

The same result can be obtained with the use of a multi-rotor lifting force generating unit shown in FIGS. 7, 8, 9. In this construction it is also possible to provide a great number of aerodynamic blades 25, 27, etc. Since the rotation of each rotor and aerodynamic blades is performed in different directions, there is no twisting of the airstream.

After the take-off and gaining required altitude, the flying apparatus can maneuver without a traveling speed. Maneuvering is performed by changing or inclining a lifting force generated by the lifting force generating units 4, 5 in FIG. 1 and 2. By turning the lifting force generating units around the axis A of the element 9 in FIG. 3, it is possible to obtain a component of the lifting force, directed forwardly or rearwardly so as to move forward and rearward with high speed. By turning the cam disk 15 with the mechanism 16 of FIGS. 3, 4, 5, it is possible to obtain a component of the lifting force directed laterally, so as to move the flying apparatus sideways. It should be mentioned that with simultaneous turning of the lifting force generating units around the axis A of the element 9, turning of the cam disks 15 and changing the rotary speed of the rotors, the lifting force is changed and the flying apparatus can assume any position relative to the ground.

Figure 2:
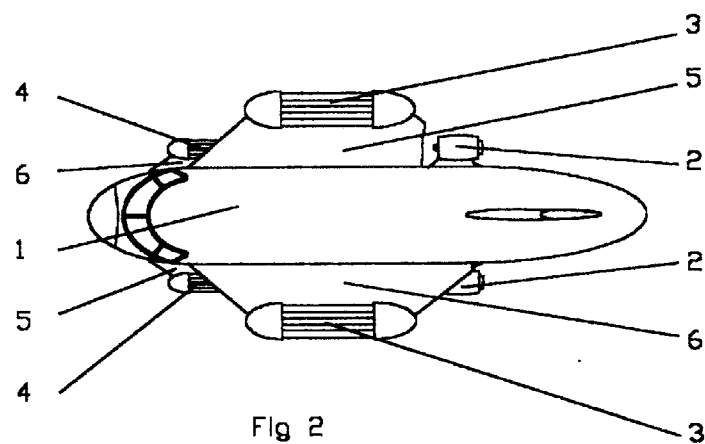

The horizontal flight of the flying apparatus is performed by the pulling force which is generated in the power units 2 of FIGS. 1, 2, while the lifting force is generated by the lifting force generating units 3, 4 and partially by the fins 5, 6 having an aerodynamic profile in their cross-section.

Inclined flight can be performed by increasing or reducing the rotary speed of the lifting force generating units 4 and as a result by increasing or reducing the lifting force. The turning of the flying apparatus is performed by the turning rudder 8 located on the keel 7, in condition of high horizontal speeds.

High horizontal speeds and high load capacity of the flying apparatus of the present invention can be obtained with the use of the mechanism for turning of a row orientation of the aerodynamic blades of FIGS. 11, 12, 13. At low speeds of the horizontal flight, the oncoming airstream, despite the streamliners 20 moves along the aerodynamic blades and causes a tearing off of the stream from the blades with resulting reduction of the lifting force. At high rotary speeds M of the aerodynamic blades, when their linear speeds approach 0.6–0.8 M, also the tearing off of the airstream takes place. In this case, the mechanism for changing the arrow orientation of the blades of FIGS. 11, 12, 13 can be utilized. The mechanism for changing an attack angle, and more particularly the lifting force generating unit with the aerodynamic blades and changing aero orientation operates in the following manner.

When critical parameters of movement of aerodynamic blades 40, 50, 51 of FIGS. 11, 12, 13 are reached, the reciprocating mechanism 59 is turned on. The rods 61 move the end part of the blades 51, which moves along the radial guide 63 of the carriage 64 and turns relative to the hinge 53 so as to simultaneously turn the middle part of the aerodynamic blades 49 to form the aero angle of the blade as shown in FIG. 12. The movement of the end part of the aerodynamic blade 50 is performed in the same manner, for which purpose the reciprocating mechanism 58 with the rod 60 is used as shown in FIG. 13. The movement of the end parts of the aerodynamic blades 50, 51 is performed both simultaneously and successively.

The flying apparatus for vertical take-off and landing of FIGS. 1 and 2 has higher maneuverability and higher speed than the helicopters. Moreover, the aerodynamic blades of the lifting force generating units do not throw the airstream downwardly, which makes this flying apparatus especially suitable during saving works in the mode of suspension above a target as well as maneuvering at the low altitudes.

It will be understood that each of the elements described above, or two or more together, may also find a useful application in other types of constructions differing from the types described above.

While the invention has been illustrated and described as embodied in flying apparatus for a vertical take off and landing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A flying apparatus, comprising a body; power means; and lifting force generating units, said lifting force generating units being arranged parallel to a vertical plane of symmetry of said body an turnable in a vertical plane, each of said lifting force generating units is formed as a rotor including a plurality of aerodynamic blades arranged uniformly on a disk and at equal distances from an axis of rotation so as to be turnable, said aerodynamic blades having axes of rotation located parallel to said vertical plane of symmetry of said body and being tunable about an axis extending perpendicular to said plane, said aerodynamic blades having a symmetrical aerodynamic profile, said aerodynamic blades being located at different distances from an axis of rotation of said rotor and on different circumferences and have different aerodynamic areas and also are located with an offset.

2. A flying apparatus, comprising a body; power means; and lifting force generating units, said lifting force generating units being arranged parallel to a vertical plane of symmetry of said body and turnable in a vertical plane, each of said lifting force generating units is formed as a rotor including a plurality of aerodynamic blades arranged uniformly on a disk and at equal distances from an axis of rotation so as to be turnable, said aerodynamic blades having axes of rotation located parallel to said vertical plane of symmetry of said body and being turnable about an axis extending perpendicular to said plane, said aerodynamic blades having a symmetrical aerodynamic profile, each of said lifting generating units including at least two rotors which are rotatable in different directions and each provided with said aerodynamic blades, an area and number of aerodynamic blades of one rotor being different from an area and a number of dynamic blades of the other rotor.

3. A flying apparatus, comprising a body; power means; and lifting force generating units, said lifting force generating units being arranged parallel to a vertical plane of symmetry of said body and turnable in a vertical plane, each of said lifting force generating units is formed as a rotor including a plurality of aerodynamic blades arranged uniformly on a disk and at equal distances from an axis of rotation so as to be turnable, said aerodynamic blades having axes of rotation located parallel to said vertical plane of symmetry of said body and being turnable about an axis extending perpendicular to said plane, said aerodynamic blades having a symmetrical aerodynamic profile, each of said lifting force generating units including at least two said rotors which are coaxial with one another, so that said aerodynamic blades of said rotors together with said rotors rotate in different directions and have different number of revolutions.

4. A flying apparatus as defined in claim 3, wherein each of said lifting generating units includes at least two rotors which are rotatable in different directions and each provided with said aerodynamic blades.

5. A flying apparatus as defined in claim 4, wherein an area and number of aerodynamic blades of one rotor is different from an area and a number of aerodynamic blades of the other rotor.

6. A flying apparatus as defined in claim 3, wherein said disks of said lifting force generating units are provided with electromagnetic coils and means for supplying electric current to said electromagnetic coils.

7. A flying apparatus as defined in claim 3; and further comprising aerodynamic streamliners provided with electromagnetic coils and means for supplying electric current to said electromagnetic coils.

8. A flying apparatus as defined in claim 4, wherein said electrodynamic blades have a changeable aerodynamic profile.

9. A flying apparatus as defined in claim 8, wherein each of said aerodynamic blades is composed of three parts hingedly connected with one another and guided in guides, said parts of each of said aerodynamic blades including two end parts which are connected through said guides and axles with said disks, said end parts of each of said aerodynamic blades being reciprocatingly moveable.

\* \* \* \* \*